United States Patent [19]
Dal Palû

[11] Patent Number: 4,675,934
[45] Date of Patent: Jun. 30, 1987

[54] CONNECTING MEMBER FOR MUTUALLY-OSCILLATING COMPONENTS ON WINDSCREEN-WIPER BLADES

[75] Inventor: Attilio Dal Palû, Rivoli, Italy
[73] Assignee: Fister S.p.A., Italy
[21] Appl. No.: 813,018
[22] Filed: Dec. 24, 1985
[51] Int. Cl.⁴ .............................................. B60S 1/38
[52] U.S. Cl. ............................. 15/250.42; 15/250.32
[58] Field of Search ....................... 15/250.42, 250.32

[56] References Cited

U.S. PATENT DOCUMENTS 4,286,351 9/1981 Mower et al. ................ 15/250.42
4,418,441 12/1983 van den Berg ................ 15/250.42

FOREIGN PATENT DOCUMENTS 2499921 8/1982 France ............................ 15/250.42
1096976 12/1967 United Kingdom ............ 15/250.32
2041730 9/1980 United Kingdom ............ 15/250.42
2159697 12/1985 United Kingdom ............ 15/250.42

Primary Examiner—James Kee Chi
Attorney, Agent, or Firm—Steele, Gould & Fried

[57] ABSTRACT

Connecting member for mutually-oscillating components on windscreen-wiper blades snap engages on to a first of the said components and has portions in which to snap engage the other of the said mutually-oscillating components.

7 Claims, 7 Drawing Figures

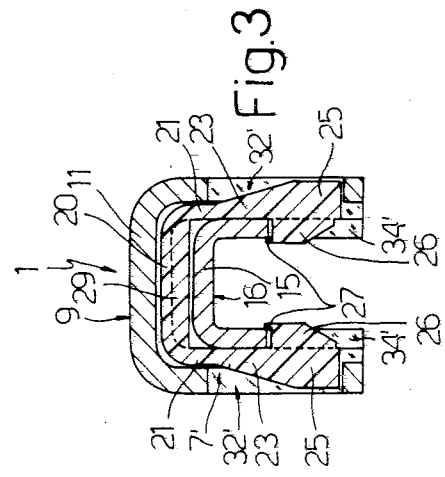
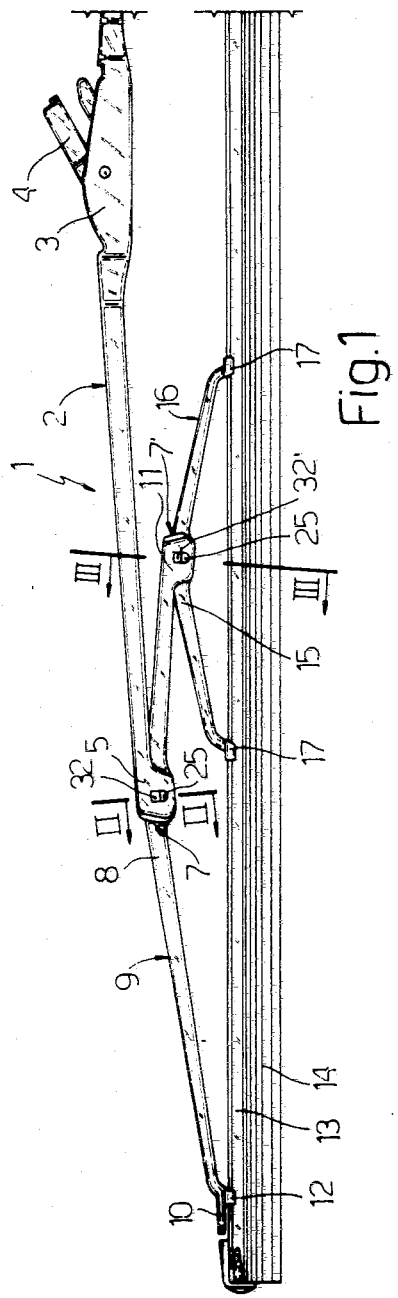
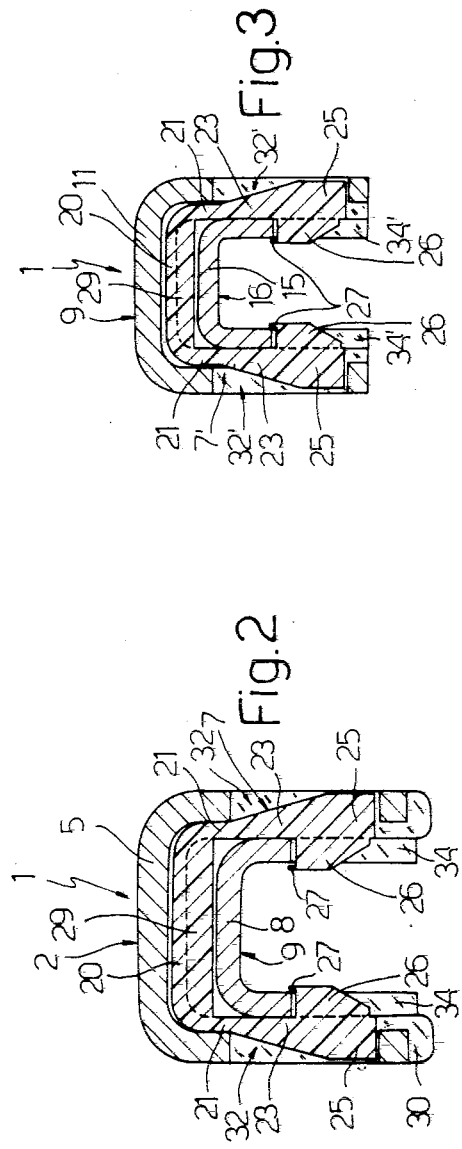

4,675,934

CONNECTING MEMBER FOR MUTUALLY-OSCILLATING COMPONENTS ON WINDSCREEN-WIPER BLADES

BACKGROUND OF THE INVENTION

The present invention relates to a connecting member for mutually-oscillating components on vehicle windscreen-wiper blades, such as the center, intermediate and/or end rocker arms.

Particularly on metal windscreen-wiper blades, the said connecting members are currently known to be made either of plastic, often bent over into engagement with the rocker arms, or of metal with rivets, etc. for assembly. In addition to the said members being difficult to assemble automatically, a further drawback involved in many designs is the existence of rubbing between the mutually-oscillating metal components on the wiper blade.

SUMMARY OF THE INVENTION

The aim of the present invention is to provide a member designed to overcome the aforementioned drawbacks, i.e. one enabling automated assembly of the windscreen-wiper blade and preventing rub between the mutually-oscillating metal components on the same.

With this aim in view, the present invention relates to a connecting member for mutually-oscillating components on windscreen-wiper blades, characterised by the fact that the said member snap engages on to a first of the said components and comprises means on which to snap engage the other of the said mutually-oscillating components.

BRIEF DESCRIPTION OF THE DRAWINGS

A non-limiting arrangement of the present invention will now be described with reference to the attached drawings in which:

FIG. 1 shows a partial side view of a windscreen-wiper blade comprising connecting members according to the present invention;

FIGS. 2 and 3 show enlarged sections along lines II—II and III—III respectively of the windscreen-wiper blade in FIG. 1;

DETAILED DESCRIPTION OF THE INVENTION

Figure 4:
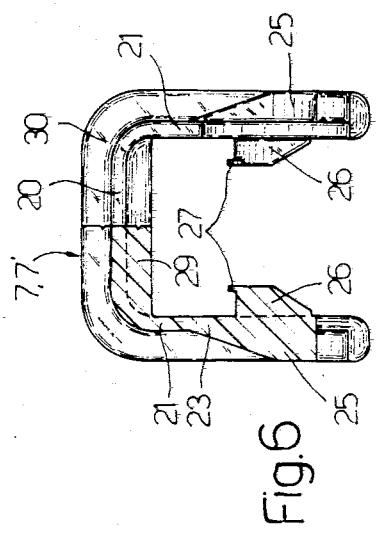
FIGS. 4 and 5 show a side and top view respectively of a connecting member according to the present invention.
Figure 6:
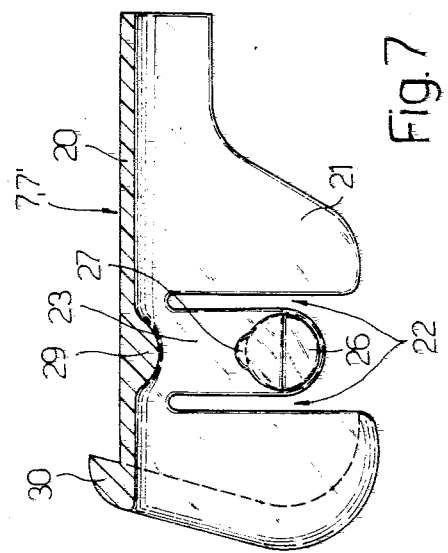
FIG. 6 shows a partially-sectioned rear view of the connecting member in FIGS. 4 and 5.
Figure 5:
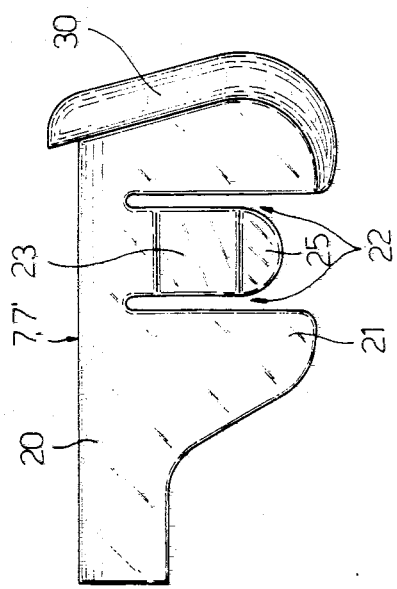
Figure 7:
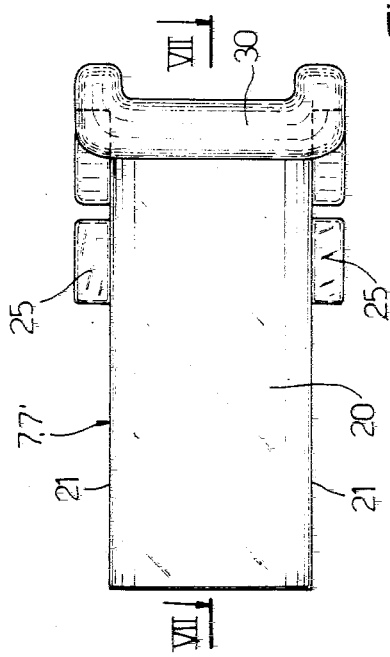
FIG. 7 shows a section along line VII—VII of the connecting member in FIG. 5.

Number 1 in FIG. 1 indicates a vehicle windscreen-wiper blade comprising, in known manner, a center rocker arm 2, the latter having a center portion 3 for housing an intermediate member 4 enabling connection to an activating arm (not shown), and two end portions 5 (only one of which is shown). By means of a connecting member 7 according to the present invention, the said end portions 5 are fitted with the centre portion 8 of an intermediate rocker arm 9 having two end portions 10 and 11, the first of which presents two feet 12 for supporting a longitudinal body 13 supporting a wiper 14, and the second of which is fitted, by means of a connecting member 7', similar to member 7 but of a different size, with the center portion 15 of an end rocker arm 16 having a pair of feet 17 at each end for supporting longitudinal body 13. Connecting members 7 and 7' are conveniently made of plastic and rocker arms 2, 9 and 16 of metal. The part of windscreen-wiper blade 1 not shown is symmetrically identical to the part illustrated in FIG. 1. As shown in FIGS. 4 to 7, connecting members 7 and 7' present a base wall 20 from which project laterally downwards two side walls 21 having, centrally, two pairs of openings 22 defining a respective flexible arm 23 thickening out downwards in such a manner as to define, at the bottom end, a portion 25 projecting outwards of side walls 21 and in opposition to which a peg 26 projects from the inner side of walls 21, the said peg 26 having an upturned rim 27 at the end. From the bottom surface of base wall 20, next to flexible arms 23, projects a curved ridge 29, whereas the front of the said member 7 or 7' presents, on base wall 20 and side walls 21, an outward-facing, shaped edge 30 curved at the bottom and matching the end contour of end portions 5 and 11 on rocker arms 2 and 9.

The connecting members according to the present invention are assembled and employed as follows.

Connecting members 7 and 7' are fitted automatically on to respective end portions 5 and 11 on rocker arms 2 and 9 by snap engaging flexible arms 23 into respective openings 32 and 32' in respective portions 5 and 11 (FIGS. 1, 2 and 3).

Projecting portions 25 on the said arms 23 remain seated inside the said openings 32 and 32', in such a manner as to prevent withdrawal of connecting members 7 and 7'. Again automatically, center portions 8 and 15 of respective rocker arms 9 and 16 are then fitted inside the said connecting members 7 and 7', which retain the said portions 8 and 15 by snap engaging respective openings 34 and 34' on to pegs 26 of arms 23 (deflection of the latter, provided for by openings 32 and 32', enabling passage of the top parts of center portions 8 and 15).

In like manner, the connecting members according to the present invention enable the various rocker arms on the windscreen-wiper to be assembled fully automatically, the same being simply snap engaged in with no need for bending over of parts into engagement or riveting. Furthermore, inserting the said connecting member between mutually-oscillating rocker arms also prevents mutual rubbing between the same.

To those skilled in the art it will be cler that changes may be made to the arrangement described and illustrated herein without, however, departing from the scope of the present invention.

I claim:

1. A plastic connecting member for connecting together two mutually-oscillating metal rocker arms, the rocker arms being components of windscreen-wiper blades, the connecting member comprising:

a base portion, a pair of opposed arms extending downwards from the base portion and joined only to the base portion so as to be capable of deflection relative to the base portion, first sides of the arms being adapted to be snap-engaged into corresponding cavities on a first of said components with the connecting member held in a fixed angular position relative to said first of said components, and second, opposite sides of the arms each carrying a peg designed to be snap engaged into a respective opening of the second of said components, the pegs being formed with end-stop rims, and the base portion presenting downwards a curved ridge which rests on a top surface of the second of said components.

2. Connecting member according to claim 1, wherein the two mutually-oscillating components are movable relative to one another, the connecting member preventing rubbing between the two mutually-oscillating components.

3. Connecting member according to claim 1 wherein said pegs are formed on the arms on opposite sides in relation to portions snap engaged into said cavities on a first of the mutually-oscillating components.

4. Connecting member according to claim 1, wherein said arms are extensions of the base portion carried in deflecting manner on the base portion and defined between spaced openings.

5. Connecting member according to claim 1, wherein the connecting member fixes the mutually-oscillating metal rocker arms at a fixed angular position of said components.

6. Connecting member according to claim 1, wherein the two mutually oscillating metal rocker arms are each one of a center, intermediate and end rocker arm on the windscreen-wiper blades.

7. Connecting member according to claim 6, wherein the connecting member is supported in snap-engageable manner at one end of the rocker arms and supports, in snap-engageable manner, a center portion of other ones of rocker arms.

* * * * *